Nov. 11, 1958 C. R. BONNELL 2,859,625
FLEXIBLE CONDUCTIVE MEANS
Filed June 6, 1955 2 Sheets-Sheet 1

INVENTOR.
CHARLES R. BONNELL
BY
ATTORNEY

Nov. 11, 1958  C. R. BONNELL  2,859,625
FLEXIBLE CONDUCTIVE MEANS
Filed June 6. 1955  2 Sheets-Sheet 2
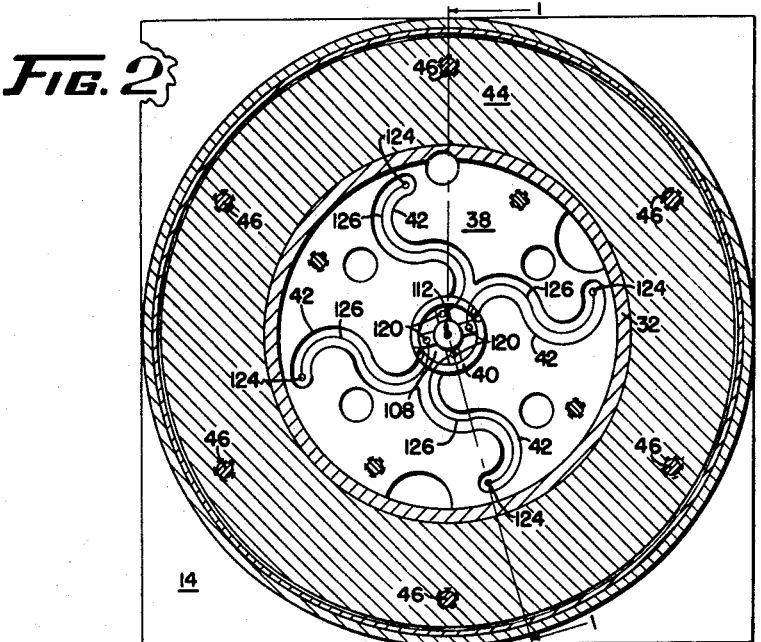
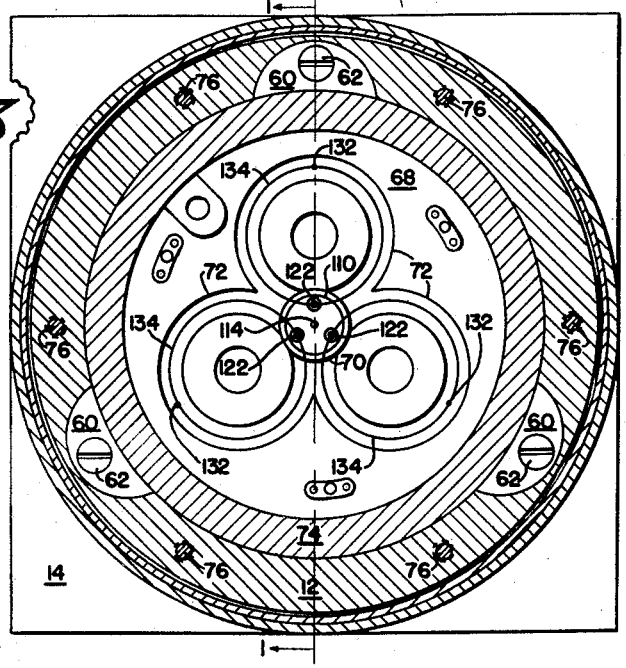
INVENTOR.
CHARLES R. BONNELL
BY
ATTORNEY

United States Patent Office 2,859,625
Patented Nov. 11, 1958

2,859,625

FLEXIBLE CONDUCTIVE MEANS

Charles R. Bonnell, Columbia Heights, Minn., assignor to Minneapolis-Honeywell Regulator Company, Minneapolis, Minn., a corporation of Delaware Application June 6, 1955, Serial No. 513,183

9 Claims. (Cl. 74—5.7)

This invention pertains to means for conducting current between a pair of relatively rotatable members. Where the relatively rotatable members have to move with respect to one another any great extent, sliding contact means such as slip rings have to be used in order to allow such movement. However, where the relatively rotatable members have to move for only relatively small angular distances, there are advantages in eliminating slip rings, one of the more important reasons being the elimination of the variable impedance between the slip ring and the wiper means in contact therewith. One of the present types of gyroscope constructions is the "floated" gyro and is an example of the type of device that may utilize my invention. Generally, in a floated gyro, a gimbal structure of hermetic construction is floated within a housing member by a viscous fluid. The gimbal has a pivotal axis with respect to the housing and is supported for rotation about this axis by very delicate bearings of the jewel type, these delicate bearings being adequate due to the fact that the main mass of the gimbal assembly is supported by the displaced fluid. The floated gyros have met with considerable success in as much as they are very sensitive and accurate. Generally, the gimbal rotates only a very small angular amount with respect to the supporting housing. The gimbal assembly includes a spin motor and may include other electrical means such as torque generators and signal generators which require electrical energization. The prior practice has been to use flexible C-shaped conductive members between the gimbal assembly and the housing for the purpose of energizing the spin motor and the other electrical apparatus on the gimbal assembly. These prior art flexible leads have generally been mounted in a common plane perpendicular to the pivotal axis of the gimbal structure. However, the prior art configuration of flexible leads is sensitive to accelerations parallel to the pivotal axis. The reason for this is that the effective center of gravity of each of the flex leads is offset from the radial line drawn from the pivotal axis and through the points of attachment of the flex lead with the gimbal and the housing.

The present invention provides an improved flexible lead which is especially applicable to floated type gyro constructions although is not limited thereto. The present invention contemplates a flexible lead whose center of gravity coincides with a radial line drawn from the pivotal axis and including the points of attachment of the lead with the gimbal assembly and the housing. One configuration of the improved flexible lead is that of a S while another configuration is circular. In the circular configuration, the cross-sectional area of the circular lead may be one half the cross-sectional area of a prior art flexible C lead and still have the same current carrying capacity since there are two current paths. However, by reducing the cross-sectional area of the improved flexible lead by one half of the prior art lead, the restraint of the lead on the gimbal is reduced 400%. To explain further, the prior art flexible leads had a certain restraint on the gimbal for a given cross-sectional area. By reducing the cross-sectional area by one half, the restraint per lead is reduced 800% but since there are now two conductive paths instead of one the total reduction in restraint on the gimbal is 400%. A further advantage of the circular flex lead configuration is that if a plurality of circular flex leads are equiangularly positioned about the pivotal axis of the gimbal assembly, the configuration is not affected by accelerations acting on the gyro perpendicular to the pivotal axis.

One of the objects of this invention is to provide an improved means of conducting current between two movable members.

A further object of the invention is to provide an improved flexible lead configuration for conducting current between a pair of movable members in a gyroscope.

Another object of the invention is to provide a flexible lead for conducting current between a pair of movable members that is not affected by accelerations parallel to the pivotal axis of said members.

Other and more specific objects of the invention, including constructional details of flexible leads embodying my invention will be set forth more fully in and become apparent from a reading of the following specification and appended claims, in conjunction with the accompanying drawings in which:

Figure 2 is a cross-sectional view of the apparatus shown in Figure 1 as seen along lines 2—2 of Figure 1; and Figure 3 is a cross-sectional view of the apparatus shown in Figure 1 as seen along lines 3—3 of Figure 1.

Figure 1:
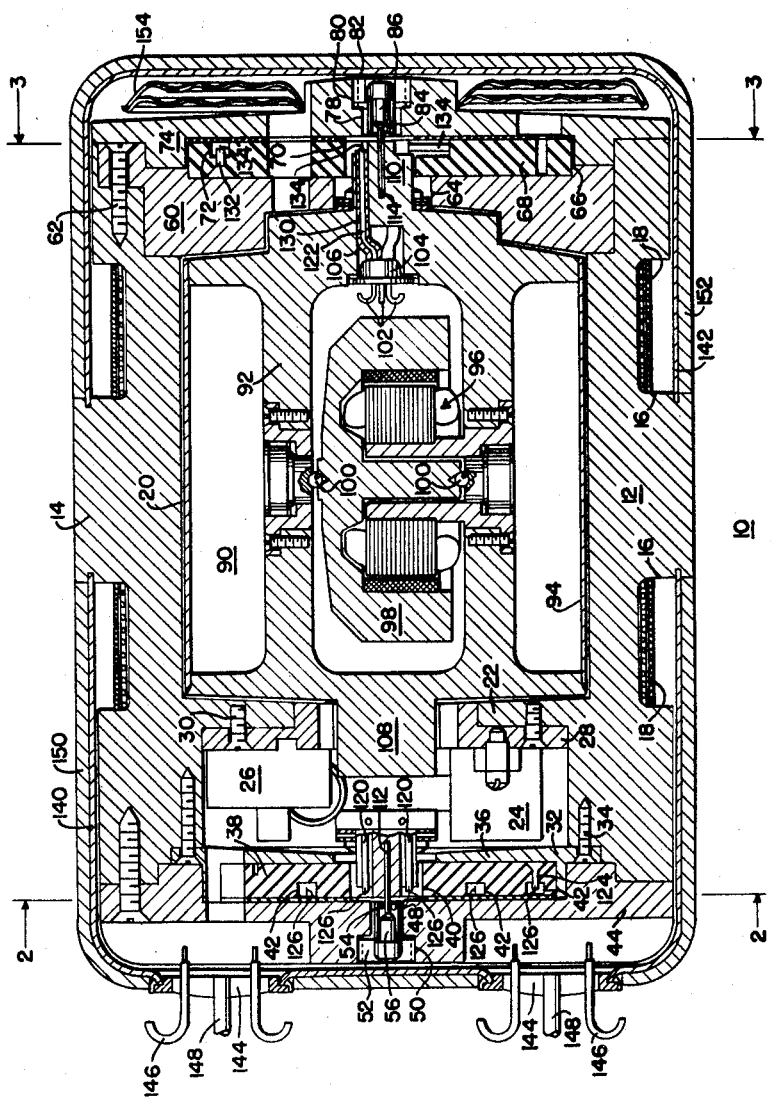
Figure 1 is a sectional elevation view of a gyroscope employing the present invention.

Referring to Figure 1, a gyro 10 comprises in part a main housing member 12 which may be made out of a suitable material such as aluminum. Housing 12 is essentially cylindrical in shape although it has a central portion 14 of square configuration so as to define a square flange which encircles the gyro at its center for providing a means of mounting the gyro to a support, not shown, at its center of gravity. The square flange also provides a reference for alignment of the gyro. The exterior of housing 12 is circumferentially grooved as at 16 on each side of flange 14 so as to provide a suitable recess for the positioning of suitable heating and temperature sensing means 18 for maintaining the temperature of the gyro at a desired level. Housing 12 has an inner cylindrical surface 20 extending a considerable portion of the length of the housing at the left end of which, as shown in Figure 1, is an inwardly extending flange portion 22. Secured to flange 22 are the stationary members of a combination torque generator 24 and signal generator 26. The stationary portions of torque generator 24 and signal generator 26 are mounted on an annular member 28 which is fastened to flange 22 of housing 12 by suitable means such as screws 30.

A baffle plate holder 32 is secured to housing 12 by suitable means such as screws 34 to the left of the torque generator and signal generator assemblies, as shown in Figure 1. Baffle plate holder member 32 has an inwardly extending flange portion 36 and is adapted to receive a baffle plate 38 made out of a suitable insulative material. Baffle plate 38 has a central aperture 40 and a plurality of S-shaped recessed channels 42 extending in a general radial direction away from aperture 40 (see Figure 2). A bearing plate 44 is secured to housing 12 by suitable means such as screws 46 and comprises a central aperture 48 of varying cross-section which is threaded in part as at 50 so as to receive a bearing insert 52 comprising a delicate journal bearing 54 as well as a thrust bearing holder 56.

An end member 60 forming part of the gyro housing is secured to the right end of the main housing member 12 as shown in Figure 1 by suitable means such as screws 62 and has a central aperture 64. Member 60 also has a circular recess 66 in which is securely positioned a baffle plate 68 which in turn has a central aperture 70 together with a plurality of circular recesses 72 (see Figure 3) in the right face thereof as viewed in Figure 1. As can be seen in Figure 3, recesses 72 are arranged equiangularly about aperture 70 in baffle plate 68.

A bearing plate 74 is secured to housing 12 by suitable means such as screws 76 (shown only in cross-section in Figure 3) and is generally similar to bearing plate 44 in that it has a central aperture 78 of varying diameters, one of which is threaded as at 80 so as to receive a jeweled insert 82 comprising in part a delicate journal bearing 84 and a thrust bearing holder 86.

A gimbal assembly 90 is positioned within housing 12 and comprises a circular frame portion 92 of a diameter slightly less than that of the inner cylindrical surface 20 of frame 12. A cylindrical shell 93 is hermetically fitted on to frame 92 and defines together with frame 12 a narrow annular gap in which is disposed a suitable fluid, not shown, of a suitable density that will tend to float the gimbal assembly.

Mounted on frame 92 of the gimbal assembly 90 is a gyro spin motor comprising a stator 96 and a rotor 98. Rotor 98 is supported for rotation with respect to stator 96 by suitable bearings 100. The spin motor is energized from a suitable source of electromotive force such as a three phase alternating current source and leads, not shown, from stator 96 are connected to pin members 102 in a liquid tight header member 104 positioned in a suitable aperture 106 in gimbal frame 92.

Gimbal frame 92 has axial central extensions 108 and 110 with pivot members 112 and 114 respectively mounted in said extensions 108 and 110 for cooperation with bearings 54 and 84. The fluid, not shown, in which gimbal assembly 90 is disposed thus supports the majority of the weight of the gimbal assembly and the bearings 54 and 84 serve only to define a pivotal axis for the gimbal assembly 90 with respect to the housing 12.

For establishing electrical connection with the movable portions, not shown in detail, of the torque generator 24 and signal generator 26 as well as the stator 96 of the spin motor, I have provided a plurality of terminals 120 around portion 108 of the gimbal frame and terminals 122 in portion 110 of gimbal frame 92. Members 120 are insulated from one another and from hub portion 108 of gimbal frame 92 by suitable insulative means and are connected by means not shown to the movable means of the torque generator 24 and signal generator 26. A plurality of metallic pin members 124 are positioned in the outer radial extremities of the S-shaped recesses 42 in baffle plate 38. A plurality of S-shaped leads 126 are connected at one end to the pins 120 on the gimbal assembly and at their other end to said pins 124 of the baffle plate 38. S-shaped leads 126 are made out of a suitable flexible conductive material such as a silver-copper alloy for example, having a composition of 85% silver and 15% copper.

Terminals 122 are insulated from hub portion 110 of gimbal frame 92 by suitable insulation means 130 and, as shown in Figure 1 are connected to pin members 102 of header 104 and thus to stator 96 of the spin motor. A plurality of pins 132 are embedded in baffle plate 68 in the recesses 72. The pins 132 are mounted in the center of said circular recesses 72 at a point farthest removed from aperture 70 in a baffle plate 68. A circular flexible lead 134 is connected between each of said pins 132 and terminals 122 and are disposed so as to lie in circular recesses 72.

Flexible leads 134 are preferably made out of the same material as the S-shaped flexible leads 126 and have a sufficient cross-sectional area to carry the current required for stator 96.

While leads 126 and 134 are shown in the drawings to have a considerable cross-section, it is to be understood that they are made as flexible as possible so as to impose as small a restraint as possible on the gimbal assembly. A typical cross-section of lead 126 is 0.0002" x 0.007" and one of lead 134 is 0.0004" x 0.0007".

A pair of inner cover members 140 and 142 which may be made out of soft iron for electromagnetic shielding purposes and which have a general cup like configuration are abutted into suitable circular recesses in the central portion 14 of main housing member 12 and are secured thereto by suitable means such as soldering and serve to enclose the gyroscopic apparatus. Secured to cover 140 by suitable means such as soldering are a pair of header members 144 each having a plurality of terminal pins 146 therein. Means not shown connect the inner extremities of pins 146 to pins 124 in baffle plate 38, pins 132 in baffle plate 68, and to the heater and temperature sensing means 18. Extending through each of headers 144 is a hollow tube 148 which permits the filling of the gyro with a suitable viscous damping fluid, not shown, after which the tubes 148 are sealed off.

A pair of outer cover members 150 and 152 are also secured to flange portion 14 of main housing member 12. Positioned between bearing plate 74 and the end of cover member 142 is a doughnut shaped bellows 154 which serves the purpose of compensating for any changes in volume of the fluid, not shown, floating the gimbal assembly.

It will be appreciated that both the S-shaped flexible leads 126 and the circular flex leads 134 have their centers of gravity lying on a line that extends radially from the pivotal axis of the gimbal assembly and includes the points of attachment for the flexible leads. By using these configurations of flexible leads, the gyro is not affected through the flexible leads by accelerations that are perpendicular to the plane of the paper for Figures 2 and 3. It will be further noted that circular flex leads 134 are arranged equiangularly about the pivotal axis for the gimbal assembly and that they lie in a plane that is substantially perpendicular to the pivotal axis. This arrangement renders the spin motor stator flexible lead assembly unaffected by accelerations parallel to the plane of the paper of Figure 3. It will also be noticed that four flexible leads 126 have been provided with diametrically opposite leads being symmetrical about the pivotal axis. I have also found that this arrangement is not basically susceptible to accelerations parallel to the plane of the paper of Figure 2 due to this symmetry.

While I have shown and described a specific embodiment of this invention, further modifications and improvements will appear to those skilled in the art. I desire it to be understood, therefore, that this invention is not limited to the particular form shown and I intend in the appended claims to cover all modifications which do not depart from the spirit and the scope of this invention.

What I claim is:

1. Apparatus of the class described comprising a first member, a second member, means pivotally mounting said first member for movement about a pivotal axis, and means for conducting electrical current between said members, said means comprising a plurality of circular conductive members each attached at one point to one of said members and at a diametrically opposite point to said other member, said points lying on a line which intersects said pivotal axis and one of said points being intermediate the other of said points and said pivotal axis.

2. Apparatus as described in claim 1 further characterized by having said plurality of circular members equiangularly positioned about said pivotal axis.

3. In a gyroscope, supporting means, gimbal means pivotally mounted on said supporting means for movement about a pivotal axis, means for conducting electrical current between said supporting and gimbal means, said conducting means comprising flexible conductive means attached at one point to said gimbal means and attached at another point to said supporting means, said conductive means being substantially symmetrical with respect to a line defined by said points of attachment, said line intersecting said pivotal axis, and one of said points being intermediate the other of said points and said pivotal axis.

4. In a gyroscope, supporting means, gimbal means pivotally mounted on said supporting means for movement about a pivotal axis, means for conducting electrical current between said supporting and gimbal means, said conducting means comprising flexible conductive means attached at one point to said gimbal means and attached at another point to said supporting means, said conductive means being substantially symmetrical with respect to a point on a line defined by said points of attachment, said line intersecting said pivotal axis, and one of said points being intermediate the other of said points and said pivotal axis.

5. Apparatus of the class described comprising in part a first member, a second member, means pivotally mounting said first member for movement about a pivotal axis, and means for conducting electrical current between said members, said means comprising a flexible conductive member attached at one point to said first member and at another point to said second member, said flexible member being curved at least in part and symmetrical with respect to the center of a line defined by said points, said line intersecting said pivotal axis and one of said points being intermediate the other of said points and said pivotal axis.

6. Apparatus of the class described comprising in part a first member, a second member, means pivotally mounting said first member for movement about a pivotal axis, and means for conducting electrical current between said members, said means comprising a plurality of flexible conductive members each attached at one of their points to said first member and at another of their points to said second member, each of said flexible members being symmetrical with respect to a point on lines defined by their respective said points, said lines each intersecting with said pivotal axis and said ones of said points being intermediate said pivotal axis and said others of said points respectively.

7. Apparatus as described in claim 6 further characterized by said plurality of flexible members being equiangularly positioned about said pivotal axis.

8. Apparatus of the class described comprising a first member, a second member, means pivotally mounting said second member on said first member for movement about a pivotal axis, and flexible circular conductive means for conducting electric current between said members, said circular means being attached at substantially diametrically opposite points to said members.

9. Apparatus of the class described comprising a first member, a second member, means pivotally mounting said second member on said first member for movement about a pivotal axis, and a flexible S-shaped conductive lead for conducting current between said members, said lead being attached at one end thereof to one of said members and at the other end thereof to the other of said members.

References Cited in the file of this patent

UNITED STATES PATENTS

| | | |
|---|---|---|
| 1,226,882 | Henderson | May 22, 1917 |
| 2,247,142 | Anscott et al. | June 24, 1941 |
| 2,384,761 | Mehan | Sept. 11, 1945 |

FOREIGN PATENTS

| | | |
|---|---|---|
| 21,671 of 1910 | Great Britain | Sept. 7, 1911 |